J. F. DUFFY & N. SCHROEDER.
Barb for Wire-Fences.
No. 165,220. Patented July 6, 1875.
Fig. 1.
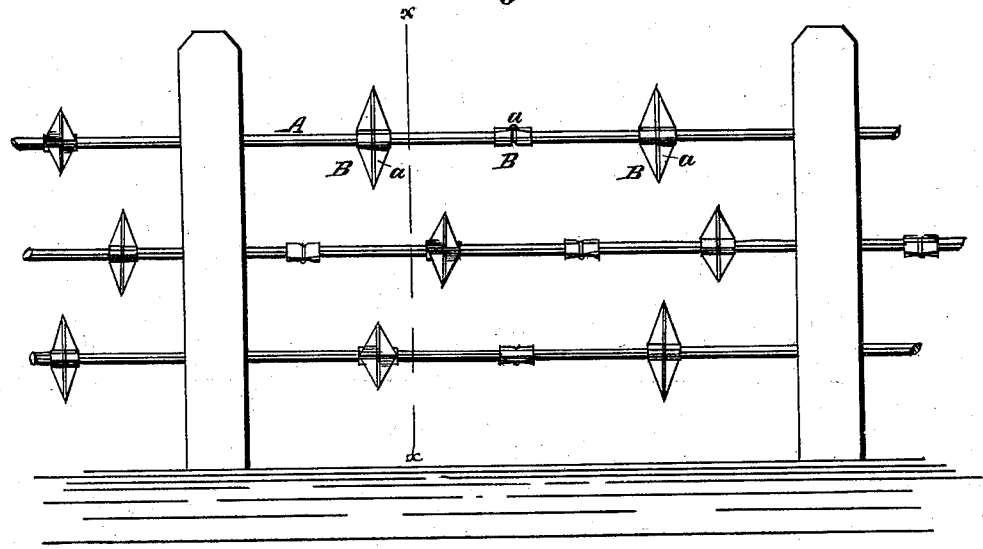
Fig. 2.
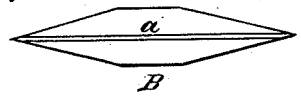
Fig. 3.
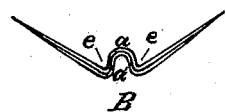
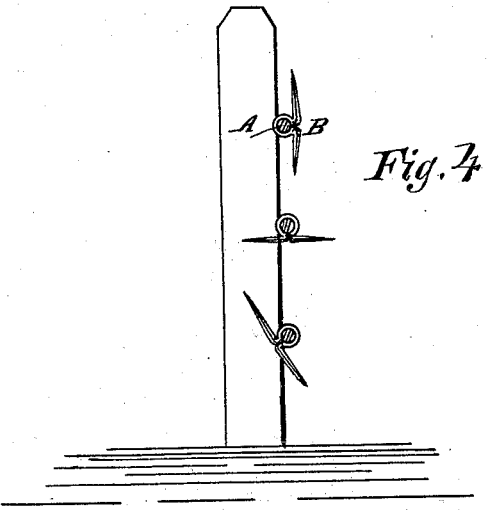
Fig. 4.
Witnesses:
F. F. Warner
N. C. Gridley
Inventors.
James F. Duffy
Nicholas Schroeder

UNITED STATES PATENT OFFICE.

JAMES F. DUFFY AND NICHOLAS SCHROEDER, OF CHICAGO, ILLINOIS.

IMPROVEMENT IN BARBS FOR WIRE FENCES.

Specification forming part of Letters Patent No. 165,220, dated July 6, 1875; application filed June 7, 1875.

*To all whom it may concern:*

Be it known that we, JAMES F. DUFFY and NICHOLAS SCHROEDER, both of Chicago, in the county of Cook and State of Illinois, have invented a new, useful, and Improved Wire-Fence Barb, of which the following is a full, clear, and exact description, which will enable others skilled in the art to which our invention appertains to make and use the said barb, reference being had to the accompanying drawing forming a part hereof, and in which—

Figure 1 is a side elevation of a section of a wire fence, representing the manner in which the barbs are applied to the wires. Fig. 2 represents the form of the barbs before being bent to receive the wires. Fig. 3 represents the manner in which the barbs are bent to receive the wires, and Fig. 4 a section in the plane of the line $x\ x$.

Like letters of reference indicate like parts.

Our object is to make a cheap and useful barb for wire fences; and to that end our invention consists in making the barb of sheet metal, and in constructing or forming it in the manner hereinafter described.

In the drawing, A represents one of the wires of a wire fence, and B B are barbs thereon. These barbs are made of pieces of light and cheap sheet metal—tin, for example—formed substantially as represented in Fig. 2, being pointed at the ends, but comparatively broad near the center, as shown.

In order to stiffen these pieces sufficiently for the purposes for which they are intended, we sink a shallow groove, $a$, therein, extending from point to point. We also arch or bend the central part of the barbs, as shown at $a'$, Fig. 3, so that they will receive the wires of the fence. The barbs are now ready for use, and may be applied to the fence by so arranging them on the wires that the latter will lie in the loops $a'$. The barbs should then be firmly attached to the wires, and arranged in such a position that the points will project in proper direction from the fence. This firm attachment may be made by seizing the barbs at the points $e\ e$ with a pair of nippers suitable for that purpose, and by pinching these points together, or nearly together, so that the barbs will firmly clasp the wires.

The barbs thus constructed may, as will be perceived, be readily attached to the fence, are stiff and firm, and may be made from scraps of sheet metal useful for no other purpose, and are thus cheap as well as useful for the purpose for which they are intended.

We are aware that barbs for wire fences have heretofore been made of sheet metal in various ways, and do not here claim such, broadly; but

Having thus described our invention, what we claim as new, and desire to secure by Letters Patent, is—

As a new article of manufacture, the wire-fence barb B, made of sheet metal, pointed at the ends and stiffened by means of the longitudinal groove or furrow $a$, and having the central loop or arch $a'$ therein for receiving the wires of the fence, substantially as shown and described.

JAMES F. DUFFY.
NICHOLAS SCHROEDER.

Witnesses:
F. A. HERRING,
JOHN KEAN.